March 27, 1934.    J. G. SISSON    1,953,028
INDICATOR
Filed Oct. 10, 1932
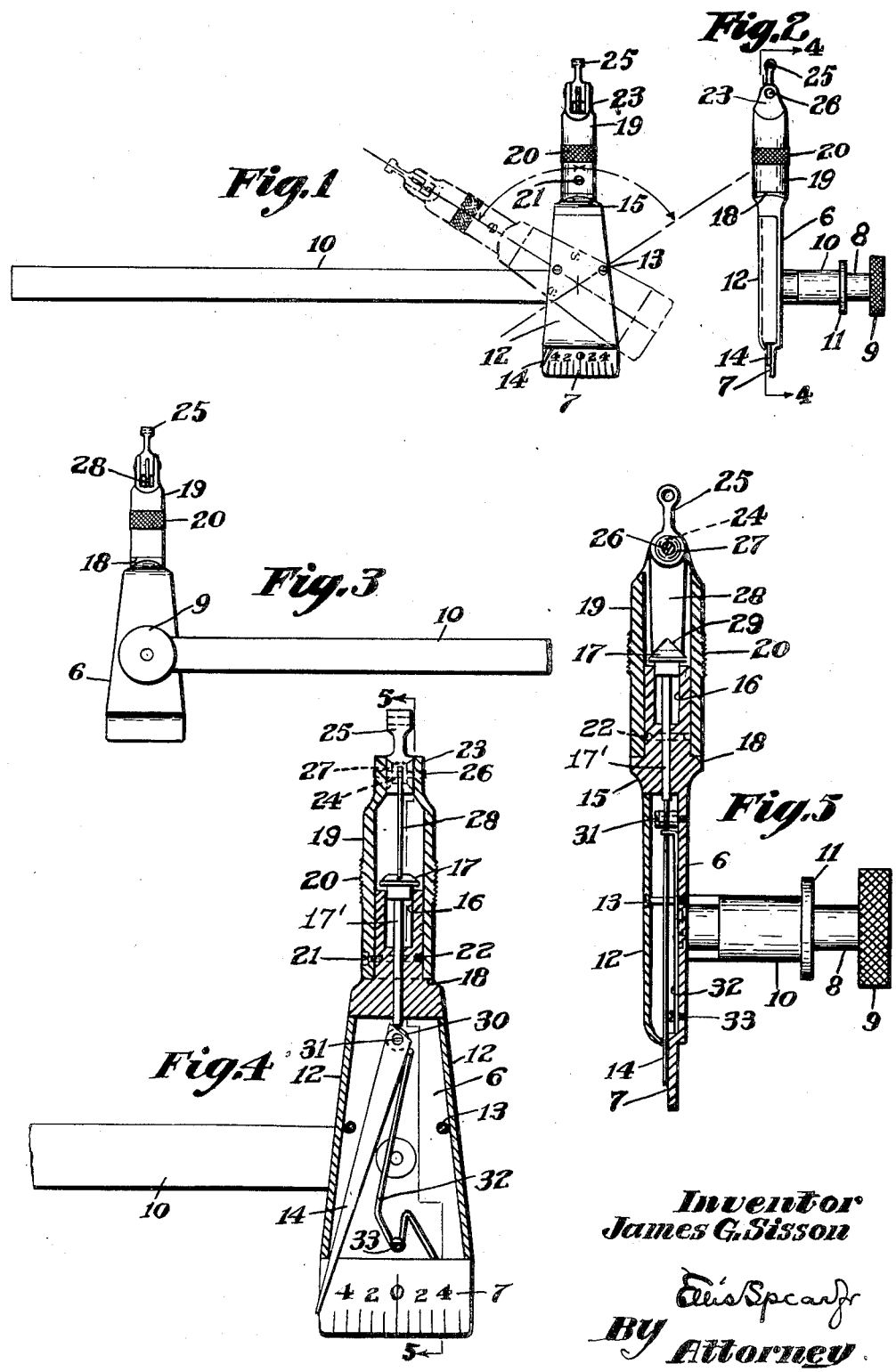
Inventor
James G. Sisson
By Ellis Spear Jr
Attorney Patented Mar. 27, 1934

1,953,028

UNITED STATES PATENT OFFICE 1,953,028

INDICATOR

James G. Sisson, Athol, Mass., assignor to The L. S. Starrett Company, Athol, Mass., a corporation of Massachusetts Application October 10, 1932, Serial No. 636,985

6 Claims. (Cl. 33—172)

This invention relates to that class of precision instruments known as test indicators. Such indicators are used by machinists, tool makers and other artisans for the purpose of testing various machinery, equipment and work to determine comparative sizes, irregularities in thickness, or unevenness or other inaccuracies of finished surface. Their field of use is chiefly in determining inaccuracies in rotating work carried by turning machines such as lathes and for testing or setting work in planers, shapers, grinders, milling machines and drill presses, and the like as well as for surface or inside testings as in height gauges.

Test indicators long ago became practically standard in the art as to their general structure and operating principles. Such improvements and refinements as have been made and patented have been minor in character.

My present invention, however, involves a matter of major importance in the functioning of the test indicator, viz, that of providing for the first time in the art an indicator which is so constructed that at one setting of the indicator the contact element may be brought into proper position to the work regardless of any pecularities of placement or otherwise of the particular set-up or lay-out which the mechanic happens to be testing. The inability of the standard indicator to meet, with but a single setting, some unusual condition of work placement has been an outstanding objection, and such inability has been due to the fact that the contact element of the indicator could not be positioned at one setting of the indicator itself accurately with respect to any set up which might confront the mechanic. Under some conditions, the standard indicator when set up to the work had to be set up in an upside down manner so that the scale was not conveniently readable. To overcome this objection it has been proposed to provide the indicator with scales on both of its faces. This, however, involves a duplication of scales and such duplication is rendered entirely unnecessary by my invention wherein the contact element which while pivoted as in the usual standard indicator is however rotatable through a complete circle relative to the head or body of the indicator so as to be positionable relative to any piece of work to be tested and to be operable from any position to which it has been rotated without requiring any further setting of the indicator itself and without requiring duplication of the scale at opposite faces of the indicator.

Other features of my present invention are to provide an instrument of extremely simple mechanical structure which, however, will have that sensitiveness and accuracy of operation so essential in a precision instrument of this character.

As illustrative of the principles involved I have shown in the accompanying drawing an embodiment of my invention what I have found highly satisfactory under actual conditions of service and well adapted to the requirements of manufacture on a commercial scale.

In such drawing:—

Fig. 1 is a side elevation of my improved indicator, the indicator for purposes of illustration being shown as rotatably mounted upon a shank by means of which it may be clamped to the tool post of a lathe, an angular adjustment of the indicator relative to such shank being also shown in dotted lines.

Fig. 2 is an edge view of Fig. 1.

Fig. 3 is a view similar to Fig. 1 but as seen from the opposite side, and

Figs. 4 and 5 are sections respectively on the lines 4—4 of Fig. 2 and 5—5 of Fig. 4.

I have indicated generally at 6 the head or body member of my improved indicator. This includes a flat plate-like portion of segmental form terminating at one end in an exposed scale face 7, which is gradated preferably as shown wherein the gradations start with a zero indication at the center of the scale face and extend laterally therefrom in opposite directions.

Extending at right angles from the body 6 is a stud 8 provided with a nut 9 by means of which the indicator may be clamped to a shank 10 by means of which the indicator may be mounted in a lathe or the like. Where used with a height gauge the body stud may carry a washer 11 beneath the clamping nut for the purpose of assisting in clamping the indicator to the overhanging jaw of the height gauge, the washer also serving to protect the jaw of the height gauge.

Secured to the body member 6 and overlying and spaced from the plate-like base portion thereof is a cover 12. This cover is preferably removable, being conveniently fastened to the body by the screws 13. The cover is of channel form terminating short of the scale face 7 which is thus exposed beyond the adjacent edge of the cover. The cover and body together define an enclosed operating space for the movable pointer 14 which cooperates with the scale face.

Beyond the upper edge of the cover the body 6 is formed as an offset enlarged portion 15 which is extended axially outwardly as a reduced hollow portion 16. The portions 15 and 16 are bored and counter-bored as shown to receive the head 17 and stem 17' of an actuating plunger which is slidable in said hollow portion 16.

Sleeved about the portion 16 of the body and seated at its lower edge on an annular shoulder 18 formed on the enlarged portion 15 of the body is an adjustable sleeve or collar 19. This collar is freely rotatable around the reduced portion 16 as a bearing, being preferably knurled as indicated at 20 to facilitate its rotation, but being prevented from accidental disengagement therefrom by an adjustment collar screw 21 which operates in an annular groove cut in the portion 16. A friction spring 22 is preferably located between the collar 19 and portion 16 for providing a slight resistance to the rotation of the collar and hence tending to hold it at any position of adjustment to which it is rotated.

The upper end of the collar is bifurcated as indicated at 23. Set between the bifurcations is a bushing 24 for the inner end of the contact element 25 of the indicator. This contact element is of the ball point type being pivoted at 26 in said bushing and being frictionally locked in any position of its pivotal motion by means of a friction washer 27.

The contact element is capable of limited pivotal motion independent of the collar 19 but of course is rotatable with said collar through a complete revolution relative to the body 6 as an axis. When moved laterally about its pivot 26, as by contact with the work to be tested, its movement is transmitted to the pointer 14 in multiplied ratio by motion transmitting connections which include a lever 28 frictionally engaged at its outer end with the contact element and formed at its inner end with a suitable shaped surface, here shown as a V or conical surface 29 within which is received the similarly formed head 17 of the plunger. The stem of said plunger coacts with the inner end of the pointer 14, such inner end being formed as an incline or cam 30.

The pointer 14 is pivoted to the body 6 as at 31 and is under the control of a plunger spring 32 which is anchored as at 33 to the body portion and at its inner end is bent to lie against one lateral edge of the pointer itself whereby normally to urge the pointer toward one side of the casing.

In use, the instrument is set up to the work to be tested, the contact 25 by reason of its capacity for rotation with sleeve or collar 19 in a complete circle about the body 6 as an axis, being brought into coactive relation to the work without requiring further setting of the instrument.

On contact of ball point 25 with the work, the resultant movement of said contact point is visually indicated in multiplied ratio by the movement of the pointer 14 over the scale 7 through the motion-transmitting and multiplying connections 28, 17 and 17'.

Various modifications in the construction and operation of my device may obviously be resorted to if within the spirit and scope of my invention without departing from the limits of the appended claims.

What I therefore claim and desire to secure by Letters Patent is:—

1. An indicator comprising a body, a sleeve mounted on said body for rotation about its longitudinal axis and for non-longitudinal movement relative thereto, a contact element pivoted to said sleeve for rocking movement in only a single plane relative thereto for a given rotary position of the sleeve, an arm operatively connected at one end with said contact element for rocking movement therewith, a slidably mounted plunger, the pivotal axis of said contact element being disposed transverse to and in intersecting relationship to a prolongation of the axis of the plunger, cooperating formations at the free end of said arm and at the adjacent end of said plunger, at least one of said formations being of substantially V-shape whereby rocking of the contact element and the arm in any position of rotation of the sleeve relative to the body effects depression of the plunger, a pointer pivoted to the body, and means whereby depression of the plunger swings said pointer.

2. An indicator comprising a body, a sleeve mounted on said body for rotation about its longitudinal axis and for non-longitudinal movement relative thereto, a pivot pin extending transversely of said sleeve, a contact element rockably mounted on said pivot pin, an arm operatively connected at one end with said contact element for rocking movement therewith, a slidably mounted plunger coaxial with the axis of rotation of said sleeve, the axis of said pivot pin being disposed at right angles to and in intersecting relationship to a prolongation of the axis of the plunger, cooperating formations at the free end of said arm and at the adjacent end of the plunger, at least one of said formations being of substantially V-shape whereby rocking of the contact element and the arm in any position of rotation of the sleeve relative to the body effects depression of the plunger, a pointer pivoted to the body, and means whereby depression of the plunger swings said pointer.

3. An indicator comprising a body, a hollow cylindrical extension at one end of said body, a sleeve mounted on said cylindrical extension for rotation about its longitudinal axis and for non-longitudinal movement relative thereto, a pivot pin at the outer end of said sleeve extending transversely thereof and disposed in intersecting relationship to a prolongation of the axis of the sleeve, a contact element rockably mounted on said pivot pin, an arm operatively connected at one end with said contact element for rocking movement therewith, said arm extending into the sleeve, a plunger coaxial with said arm and slidably mounted in said cylindrical extension, the free end of said arm and the adjacent end of said plunger having cooperating formations at least one of which is of substantially V-shape whereby rocking of the arm in any position of rotation of the sleeve effects depression of the plunger, a pointer pivoted to the body, and means whereby depression of the plunger swings said pointer.

4. An indicator comprising a body, a hollow cylindrical extension at one end of said body, a sleeve mounted on said cylindrical extension for rotation and non-longitudinal movement relative thereto, a pivot pin at the outer end of said sleeve and extending transversely thereof in intersecting relationship to a prolongation of the axis of the sleeve, a contact element mounted on said pivot pin and rotatable with said sleeve through a complete revolution about said cylindrical extension and also rockable about said pivot pin as an axis through a limited arc independently of the rotation of said sleeve, an arm extending into said sleeve and operatively connected with said contact element for rocking movement therewith, a plunger coaxial with said arm and slidably mounted within said cylindrical extension, said plunger and arm having cooperating formations such that rocking of the arm in any position of rotation of the sleeve effects depression of said plunger, and a pointer pivoted to the body, and operatively connected to the plunger so as to be swung thereby whenever the plunger is depressed.

5. An indicator comprising a body, a hollow cylindrical extension at one end of said body, a sleeve mounted on said cylindrical extension for rotation and non-longitudinal movement relative thereto, a pivot pin at the outer end of said sleeve and extending transversely thereof in intersecting relationship to a prolongation of the axis of the sleeve, a contact element mounted on said pivot pin and rotatable with said sleeve through a complete revolution about said cylindrical extension and also rockable about said pivot pin as an axis through a limited arc independently of the rotation of said sleeve, a plunger slidably mounted within said cylindrical extension, motion transmitting connections between said contact element and plunger such that rocking of the contact element in any position of rotation of the sleeve effects depression of the plunger, and a pointer pivoted to the body and operatively connected to the plunger so as to be swung thereby whenever the plunger is depressed.

6. An indicator comprising a body member having a flat portion terminating at one end in an exposed scale face and at its other end in an offset enlarged portion provided with a reduced axially disposed cylindrical extension, a sleeve disposed about said reduced cylindrical extension for rotation and non-longitudinal movement relative thereto, a pivot pin at the outer end of said sleeve and extending transversely thereof in intersecting relationship to a prolongation of the axis of said sleeve, a contact element rockably mounted on said pivot pin and rotatable with said sleeve through a complete revolution, about said cylindrical extension as an axis and also rockable about said pivot pin as an axis through a limited arc independently of the rotation of said sleeve, an arm extending into said sleeve and operatively connected with said contact element for rocking movement therewith, a plunger coaxial with said arm and slidably mounted in said cylindrical extension, said arm and plunger having cooperating formations such that rocking of the arm in any position of rotation of the sleeve effects depression of the plunger, and a pointer pivoted to the body and operatively connected to the plunger so as to be swung thereby whenever said plunger is depressed.

JAMES G. SISSON.